United States Patent [19]
Emmons et al.

[11] Patent Number: 5,319,733
[45] Date of Patent: Jun. 7, 1994

[54] VARIABLE FIBER OPTICAL ATTENUATOR

[75] Inventors: David J. Emmons, Plymouth; Liang-Ju Lu, Eden Prairie, both of Minn.

[73] Assignee: ADC Telecommunications, Inc., Minneapolis, Minn.

[21] Appl. No.: 816,106

[22] Filed: Jan. 2, 1992

[51] Int. Cl.⁵ .............................................. G02B 6/36
[52] U.S. Cl. .................................... 385/140; 385/73; 385/85
[58] Field of Search ................. 385/73, 85, 140, 23, 385/25, 38, 50, 52, 60, 66, 68

[56] References Cited

U.S. PATENT DOCUMENTS

| | | | |
|---|---|---|---|
| 3,981,561 | 9/1976 | Weiss et al. | 350/312 |
| 4,142,126 | 2/1979 | DuBois | 313/497 |
| 4,257,671 | 3/1981 | Barbaudy et al. | 350/96.15 |
| 4,261,640 | 4/1981 | Stankos et al. | 350/96.15 |
| 4,378,490 | 3/1983 | d'Auria Luigi | 250/201 |
| 4,516,827 | 5/1985 | Lance et al. | 350/96.15 |
| 4,529,262 | 7/1985 | Ashkin et al. | 350/96.15 |
| 4,557,556 | 12/1985 | Decker, Jr. | 350/96.21 |
| 4,557,557 | 12/1985 | Gleason et al. | 350/96.21 |
| 4,591,231 | 5/1986 | Kaiser et al. | 350/96.18 |
| 4,639,078 | 1/1987 | Sheem | 350/96.21 |
| 4,644,145 | 2/1987 | Gundner | 250/227 |
| 4,645,294 | 2/1987 | Oguey et al. | 350/96.15 |
| 4,692,610 | 9/1987 | Szuchy | 250/227 |
| 4,695,125 | 9/1987 | Sinclair et al. | 350/96.2 |
| 4,702,549 | 10/1987 | Duck et al. | 350/96.15 |
| 4,728,170 | 3/1988 | Robertson | 350/96.15 |
| 4,747,673 | 5/1988 | Marrs et al. | 350/372 |
| 4,749,255 | 6/1988 | Klausz | 350/345 |
| 4,787,700 | 11/1988 | Yin | 385/140 |
| 4,878,730 | 11/1989 | Wall | 350/96.21 |
| 4,881,793 | 11/1989 | Tarbox | 350/96.21 |
| 4,884,859 | 12/1989 | Yamamoto et al. | 350/96.15 |
| 4,893,889 | 1/1990 | Iwakiri et al. | 385/140 |
| 4,904,044 | 2/1990 | Tamulevich | 350/96.18 |
| 5,031,994 | 7/1991 | Emmons | 350/96.2 |
| 5,037,176 | 8/1991 | Roberts et al. | 385/16 |
| 5,066,094 | 11/1991 | Takahashi | 385/140 |
| 5,136,681 | 8/1992 | Takahashi | 385/140 |

FOREIGN PATENT DOCUMENTS

| | | |
|---|---|---|
| 74499 | 3/1983 | European Pat. Off. . |
| 0089758 | 9/1983 | European Pat. Off. . |
| 144136 | 6/1985 | European Pat. Off. . |
| 404587 | 12/1990 | European Pat. Off. . |
| 411350 | 2/1992 | European Pat. Off. . |
| 3042587 | 4/1982 | Fed. Rep. of Germany . |
| 157633 | 11/1982 | Fed. Rep. of Germany . |
| 3419733 | 11/1985 | Fed. Rep. of Germany . |
| 3528285 | 2/1987 | Fed. Rep. of Germany . |
| 2533323 | 3/1984 | France . |
| 2598820 | 11/1987 | France . |
| 59-55649 | 3/1984 | Japan . |
| 59-127003 | 7/1984 | Japan . |
| 61-26003 | 2/1986 | Japan . |
| 62-10935 | 1/1987 | Japan . |
| 63-39223 | 2/1988 | Japan . |
| 2042402 | 2/1990 | Japan . |
| 2-281224 | 11/1990 | Japan .................................. 385/140 |
| 1066948 | 1/1984 | U.S.S.R. . |
| 1118944 | 10/1984 | U.S.S.R. . |
| 1151906 | 4/1985 | U.S.S.R. . |
| 1300303 | 3/1987 | U.S.S.R. . |
| 1300306 | 3/1987 | U.S.S.R. . |
| 1381410 | 3/1988 | U.S.S.R. . |
| 1408409 | 7/1988 | U.S.S.R. . |
| 1437823 | 11/1988 | U.S.S.R. . |
| 2074339A | 10/1981 | United Kingdom . |
| 2088578 | 6/1982 | United Kingdom . |
| 2128766A | 5/1984 | United Kingdom . |
| 2138161A | 10/1984 | United Kingdom . |
| 2140167 | 11/1984 | United Kingdom . |
| 2162113A | 1/1986 | United Kingdom . |
| 2190211A | 11/1987 | United Kingdom . |
| 2192070A | 12/1987 | United Kingdom . |

*Primary Examiner*—Rodney B. Bovernick
*Assistant Examiner*—John Ngo
*Attorney, Agent, or Firm*—Merchant, Gould, Smith, Edell, Welter & Schmidt

[57] ABSTRACT

A variable attenuator for a fiber optic transmission system includes first and second optical fibers which are axially aligned. The fibers are provided with spherical polishes. The radius of each of the fibers originates at an axis which is offset from an axis of the fiber cores.

18 Claims, 4 Drawing Sheets

VARIABLE FIBER OPTICAL ATTENUATOR

I. BACKGROUND OF THE INVENTION

1. Field of the Invention

This invention pertains to fiber optic attenuators. More particularly, this invention pertains to an attenuator which may be continuously varied to have an attenuation throughout a range of values.

2. Description of the Prior Art

In the prior art, optical attenuators are provided to attenuate a light signal passing through optical fibers. Examples of optical attenuators are shown in U.S. Pat. Nos. 4,557,556 and 4,557,557 as well as U.S. Pat. No. 4,893,889.

Variable attenuators are also known. An example of such is shown in U.S. Pat. No. 4,904,044. That patent teaches a continuously variable fiber optic attenuator which utilizes a flexible filter of varying optical density.

It is an object of the present invention to provide a variable attenuator for a fiber optic transmission system. It is a further object of the present invention to provide such an attenuator which is of low cost manufacture. A still further object of the present invention is to provide a variable attenuator which is variable over a wide range of attenuation values.

II. SUMMARY OF THE INVENTION

According to a preferred embodiment of the present invention, an attenuator is disclosed for a fiber optic transmission system. The attenuator includes a first optical fiber having a first core which terminates at a first terminal end. The first terminal end has a non-orthogonal surface relative to a first axis of the first core. A second optical fiber having a second core is provided terminating at a second terminal end. An alignment mechanism is provided for aligning the first terminal end in optically coupled relation to the second terminal end for permitting rotation of the first fiber about the first axis.

III. BRIEF DESCRIPTION OF THE DRAWINGS

IV. DESCRIPTION OF THE PREFERRED EMBODIMENT

Figure 1:
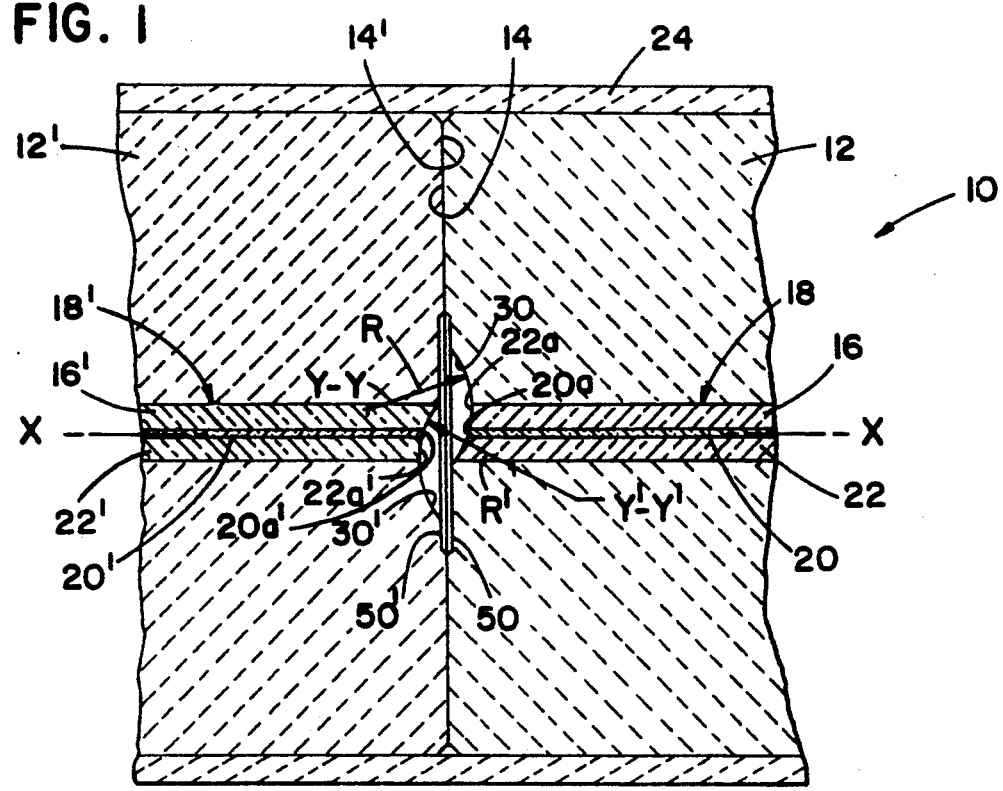
FIG. 1 is a cross sectional view of an attenuator according to the present invention.
Figure 7:
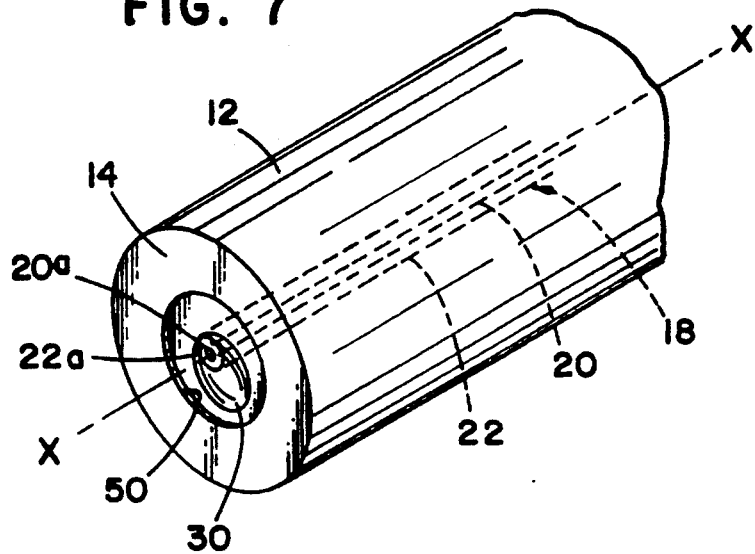
FIG. 7 is a perspective view of a ferrule and fiber assembly for use in the present invention.

With initial reference to FIGS. 1 and 7, a description of the present invention will now be provided. In the figures, similar elements are numbered identically throughout.

The present invention is an attenuator 10 which includes a first ceramic ferrule 12 and a second ceramic ferrule 12'. Each of ferrules 12,12' is generally cylindrical and is preferably formed of ceramic or drawn glass. The ferrules 12,12' terminate at flat axial faces 14,14'. Extending axially through each of ferrules 12,12' is a central bore 16,16'. Disposed within each bore 16,16' is an optical fiber 18,18'. Each optical fiber includes a fiber core 20,20' surrounded by a cladding 22,22'.

Optical fibers such as fibers 18,18' are well known. Typically, such fibers have an outside diameter of about 0.125 millimeters and a core diameter of about 0.010 millimeters for single mode fibers (0.050 mm for multimode fibers). The fibers 20,20' terminate at terminal ends 20a,20a'. Similarly, the cores 22,22' terminate at terminal ends 22a,22a'.

An alignment mechanism in the form of a split sleeve 24 is provided for retaining the ferrules 12,12' in axial alignment with faces 14,14' abutting and with the cores 20,20' optically aligned along an axis X—X and with the core terminal ends 20a,20a' opposing one another. With the ferrules 12,12' disposed within split sleeve 24, the ferrules 12,12' are rotatable relative to one another about axis X—X. Throughout the rotation of any ferrule 12,12', the terminal ends 20a,20a' of the cores 20,20' remain optically coupled. It will be appreciated that apparatus such as split sleeves 24 for retaining ferrules 12,12' in optical alignment forms no part of this invention per se. Such arrangement is shown in commonly assigned U.S. Pat. No. 5,031,994 which also shows a housing for housing such an assembly and rotating ferrules.

As shown in FIG. 1, each of the ferrules 12,12' is provided with a polish on the end faces 14,14'. For example, a first polish 30 is provided in end face 14. Polish 30 is a spherical polish of radius R taken from a spherical axis Y—Y. A similar polish 30' is formed in end face 14' and having radius R' projected from a spherical axis Y'—Y'.

Forming a spherical concave polish on an end face of a ferrule forms no part of this invention per se. Such a polish and a technique for such a polish is shown in commonly assigned and copending U.S. Pat. No. 5,037,176.

As illustrated in FIG. 1, the spherical polishes 30,30' are off-center from the axis X—X of the ferrules 12,12'. Specifically, each of the spherical axes Y—Y and Y'—Y' are offset from axis X—X. As a result, the end faces 20a,20a' of cores 20,20' and claddings 22,22' are non-orthogonal surfaces relative to the axis X—X of the cores 20,20' and claddings 22,22'.

Figure 4:
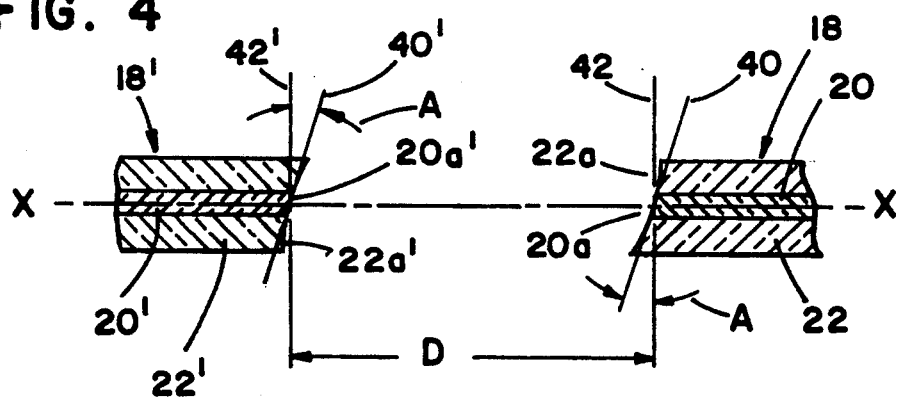
FIG. 4 is an enlarged view of a portion of the view of FIG. 1.

FIG. 4 is an enlarged view of a portion of FIG. 1 showing only the cores 20,20', claddings 22,22', and their end faces 20a,20a', 22a,22a'. As a result of the polishes 30,30' the end faces 20a,20a', 22a,22a, are small sections of a spherical surface and present tangent planes 40,40' on the arcuate surfaces of the end faces 20a,20a'. The spherical polishes 30,30' are preferably selected such that the tangent planes 40,40' form an angle A,A'0 of about 10°0 to 20° (preferably 15°) with respect to an orthogonal plane 42,42' extending through the axis X—X at the point of intersection between the tangent planes 40,40' and the axis X—X.

In addition to recesses 30,30', recesses 50,50' are provided on surfaces 14,14' and concentric with axis X—X. Recesses 50,50' form no part of the attenuation invention. Instead, these recesses are provided to facilitate the addition of anti-reflective coatings to the surfaces 20a,20a'. The recesses 50,50' cooperate with a mask (not shown) when depositing an anti-reflective coating. The use of such a mask in combination with recesses 50,50' is the subject of copending and commonly assigned U.S. patent application Ser. No. 07/730,734 filed Jul. 16, 1991.

With the structure thus described, the end faces 14,14' are urged into abutting relation. As a result, a distance, gap D, between core end faces 20a,20a' is maintained constant. As the ferrules 12,12' are rotated relative to one another, the opposing geometry between end faces 20a,20a' varies. For example, the ferrules 12,12' can be rotated from 0° to 180° relative to one another.

Figure 2:
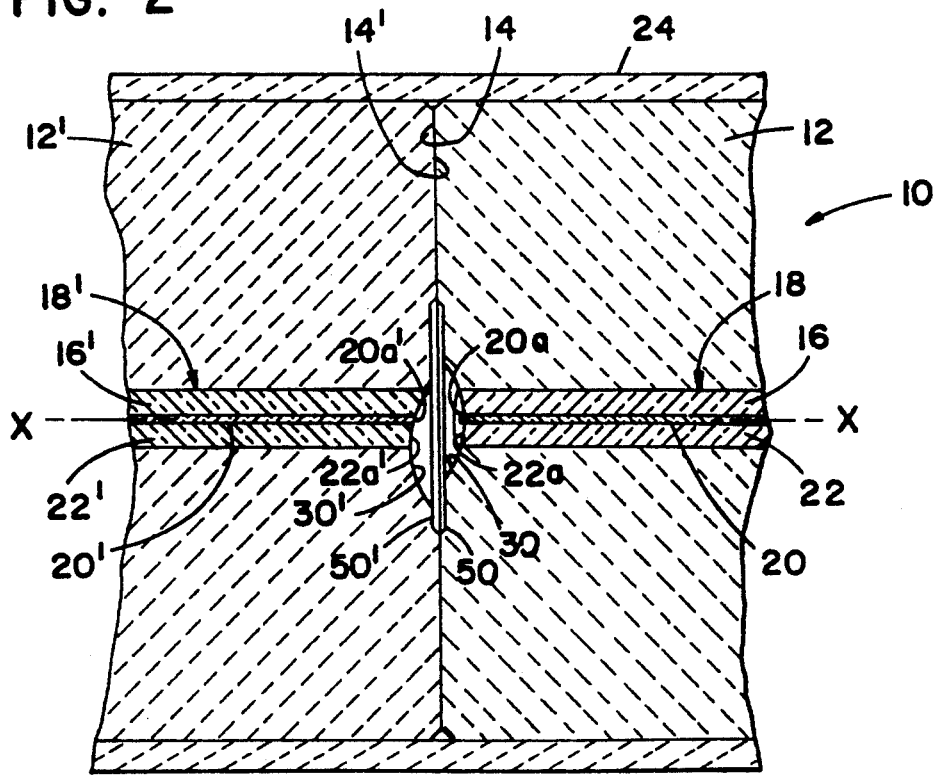
FIG. 2 is the view of FIG. 1 with one fiber of FIG. 1 shown rotated 90°.
Figure 3:
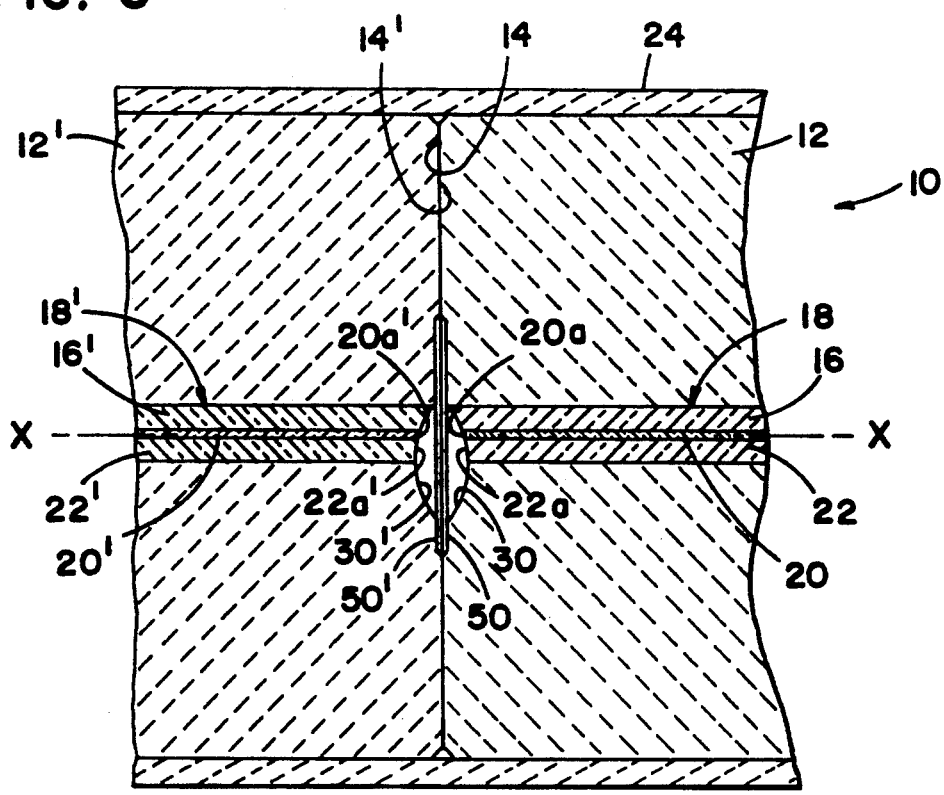
FIG. 3 is the view of FIGS. 1 and 2 showing a fiber rotated 180°.
Figure 5:
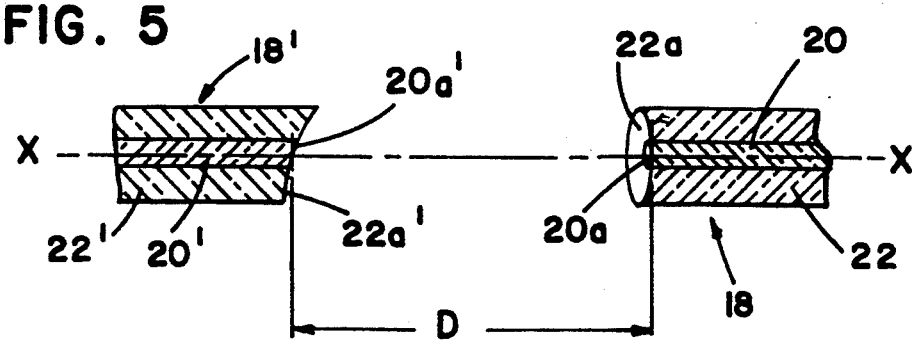
FIG. 5 is an enlarged view of a portion of the view of FIG. 2.
Figure 6:
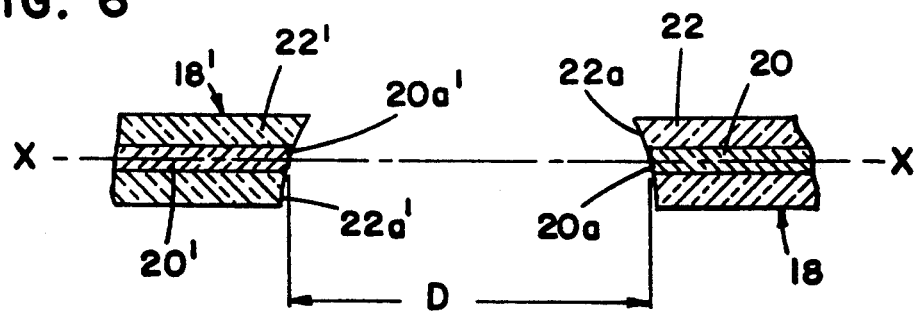
FIG. 6 is an enlarged view of a portion of the view of FIG. 3.

FIG. 2 shows ferrule 12 rotated 90° from the position shown in FIG. 1. FIG. 3 shows ferrule 12 rotated 180° from the view shown in FIG. 1. FIG. 5 is similar to FIG. 4 only showing the enlargement of the similar area of FIG. 2. FIG. 6 is similar to FIGS. 4 and 5 showing the 180° rotated cores of FIG. 3.

From examination of FIGS. 4–6, the reader will appreciate that as one ferrule 12 rotates relative to the other ferrule 12', opposing tangent planes 40,40' move from being generally parallel to being offset by as much as about 20° to 40° (for tangent angles of 10° and 20°, respectively). It will be appreciated that the particular use of a 15° tangent plane for the polish is a preferred embodiment and may vary while retaining the essence of the present invention.

As the ferrules 12,12' rotate relative to one another and the angular separation between the core faces 20a,20a' varies, attenuation of signal transmission through fibers 18,18' will vary. The attenuation can range from about 1 dB to about 30 dB by simply turning one ferrule 12,12' relative to the other. Since the 15° tangent angle A,A' is a concave polish, back reflection into a fiber 18,18' is significantly reduced to be about less than about −65 dB. Since the gap D is fixed and the end of the ferrules 14,14' is provided with the concave polish 30,30', the modal interference and multiple-beam interference are minimized. The present attenuator 10 is particularly useful in bi-directional operation because of the compact hardware design. The main attenuation mechanism is the tangent angle A,A' resulting from the concave polishing which creates conjugate angular offset loss. Other advantages of the attenuator 10 include its low coherent affect. The conjugate angular offset loss mechanism provides a stable and adjustable attenuator 10. There is a high return loss with a low insertion loss. Further, it is adjustable between 0° and 180°. The present attenuator 10 is insensitive to wavelength and polarization and has low modal noise.

Figure 8:
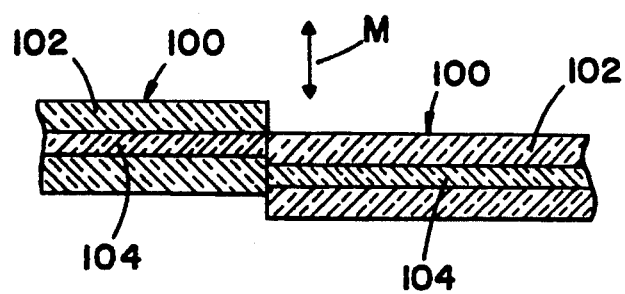
FIGS. 8–10 illustrate various forms of attenuation between opposing optical fibers.
Figure 9:
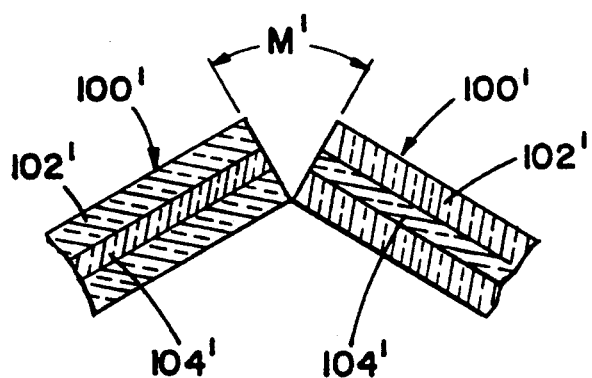
Figure 10:
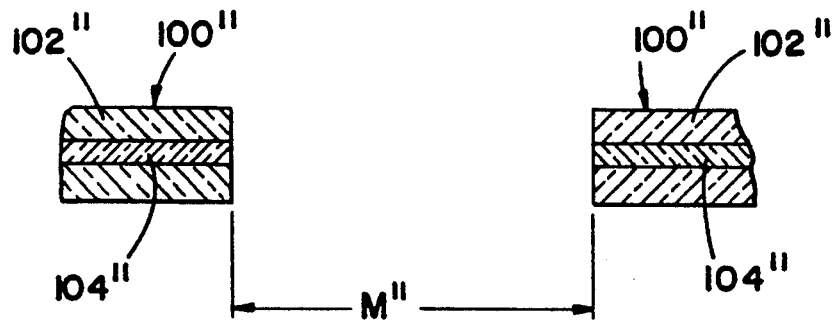

The attenuator 10 attenuates primarily through angular attenuation. For convenience of illustration, FIGS. 8–10 illustrate three types of attenuation. In each of the figures, identical elements are numbered identically throughout except for the addition of the prime or the double prime in FIGS. 9 and 10. In FIG. 8, transverse attenuation is shown for optical fibers 100 which include cores 104 and cladding 102. The transverse attenuation occurs by reason of offsetting the axes of the fibers 100 through movement in the direction of arrow M. In FIG. 9, angular attenuation is illustrated where the attenuation is varied by varying the angle represented by the angle M'. In FIG. 10, longitudinal attenuation is demonstrated where the attenuation is varied by varying the gap M''. In the present invention, the gap D (preferably less than 0.020 mm) in FIGS. 4–6 remains constant. As a result, the attenuation is primarily angular due to relative rotation of the opposing fibers. Importantly, transverse attenuation is minimized. This is desirable since transverse attenuation is particularly unstable.

The foregoing description has illustrated a preferred embodiment where the attenuator 10 is variable. The attenuator 10 can also be used as a fixed attenuation connector. In this embodiment, the attenuator is a low insertion loss, high return loss connector. As such, opposing ferrules 12, 12' are removable from one another by sliding at least one in the direction of axis X—X (such sliding connections are well known in the fiber optic connector art). The ferrules 12, 12' are fixed from relative rotation. The fixed position is selected by first rotating the ferrules 12, 12' relative to another until a desired attenuation is attained and the ferrules are fixed against further rotation through any known fixation means.

Having described the preferred embodiment to the present invention, it will be appreciated that modifications and equivalents of the disclosed concepts, such as those which readily occur to ones skilled in the art, are intended to be included within the scope of the present invention.

What is claimed is:

1. An attenuator for a fiber optic transmission system, said attenuator comprising:
    a first optical fiber having a first core terminating at a first terminal end with said first terminal end having a non-orthogonal surface relative to a first axis of said first core;
    a second optical fiber having a second core terminating at a second terminal end;
    aligning means for aligning said first terminal end in optically coupled relation to said second terminal end while permitting rotation of said first fiber about said first axis and while maintaining substantially constant and unchanged axial alignment of said first axis with an axis of said second core throughout said rotation; and
    said first and second optical fibers retained in first and second fiber holders, respectively; said aligning means including means for permitting relative rotation of said first and second holder while maintaining opposing ends of said first and second holders in contact.

2. An attenuator according to claim 1 wherein said second fiber as a non-orthogonal surface relative to a second axis of said second core.

3. An attenuator according to claim 1 wherein said first fiber is disposed within a ferrule; a polish formed on said ferrule and forming, in part, said first surface.

4. An attenuator according to claim 2 wherein said second fiber is disposed within a second ferrule having a polish formed on said ferrule with said polish forming, in part, said second surface.

5. An attenuator according to claim 1 wherein said first and second optical fibers are maintained in spaced opposing relation with a spacing between said cores being substantially fixed.

6. An attenuator according to claim 1 wherein said first and second fibers are rotated to a position associated with a desired attenuation and fixed at said position against further rotation.

7. An attenuator for a fiber optic transmission system, said attenuator comprising:
    a first optical fiber having a first core terminating at a first terminal end with said first terminal end having a first non-orthogonal surface relative to a first axis of said first core;

a second optical fiber having a second core terminating at a second terminal end, said second fiber having a second non-orthogonal surface relative to a second axis of said second core;

aligning means for aligning said first terminal end in optically coupled relation to said second terminal end while permitting rotation of said first fiber about said first axis;

said first axis and said second axis are colinearly aligned; and said aligning means including means for permitting relative rotation of said first and second fibers about said first and second axes while maintaining opposing ends of said first and second fibers in substantially constant axial spacing throughout said relative rotation.

8. An attenuator for a fiber optic transmission system, said attenuator comprising:

a first optical fiber having a first core terminating at a first terminal end with said first terminal end having a first non-orthogonal surface relative to a first axis of said first core;

a second optical fiber having a second core terminating at a second terminal end;

aligning means for aligning said first terminal end in optically coupled relation to said second terminal end while permitting rotation of said first fiber about said first axis, and said first surface is non-planar.

9. An attenuator according to claim 8 wherein said first surface is a portion of a spherical surface.

10. An attenuator for a fiber optic transmission system, said attenuator comprising:

a first optical fiber having a first core terminating at a first terminal end with said first terminal end having a first non-orthogonal surface relative to a first axis of said first core;

a second optical fiber having a second core terminating at a second terminal end, said second fiber having a second non-orthogonal surface relative to a second axis of said second core;

aligning means for aligning said first terminal end in optically coupled relation to said second terminal end while permitting rotation of said first fiber about said first axis; and said second surface is non-planar.

11. An attenuator according to claim 10 wherein said second surface is a portion of a spherical surface.

12. An attenuator for a fiber optic transmission system, said attenuator comprising:

a first optical fiber having a first core terminating at a first terminal end with said first terminal end having a first non-orthogonal surface relative to a first axis of said first core, said first fiber is disposed within ferrule; a polish formed on said ferrule and forming, in part, said first surface;

a second optical fiber having a second core terminating at a second terminal end;

aligning means for aligning said first terminal end in optically coupled relation to said second terminal end while permitting rotation of said first fiber about said first axis; and said polish is spherical and concave.

13. An attenuator according to claim 12 wherein said polish is provided with a radius having an axis offset from said first axis.

14. An attenuation for a fiber optic transmission system, said attenuator comprising:

a first optical fiber having a first core terminating at a first terminal end with said first terminal end having a first non-orthogonal surface relative to a first axis of said first core;

a second optical fiber having a second core terminating at a second terminal end, said second fiber having a second non-orthogonal surface relative to a second axis of said second core, said second fiber is disposed within a second ferrule having a polish formed on said ferrule with said polish forming, in part, said second surface;

aligning means for aligning said first terminal end in optically coupled relation to said second terminal end while permitting rotation of said first fiber about said first axis; and said polish is spherical.

15. An attenuator according to claim 14 wherein said polish has a radius which is offset from said second axis.

16. An attenuator for a fiber optic transmission system, said attenuator comprising:

a first optical fiber having a first core terminating at a first terminal end with said first terminal end having a first non-orthogonal surface relative to a first axis of said first core;

a second optical fiber having a second core terminating at a second terminal end with said second terminal end having a non-orthogonal surface relative to a second axis of said second core;

said first and second optical fibers maintained in generally coaxial alignment with said first and second fibers rotatable relative to one another and with a spacing between said cores at said axis being substantially constant and;

said first and second optical fibers retained in first and second fiber holder, respectively; said aligning means including means for permitting relative rotation of said first and second holders while maintaining said first and second holders in fixed coaxial spacing.

17. An attenuator for a fiber optic transmission system, said attenuator comprising:

a first optical fiber having a first core terminating at a first terminal end with said first terminal end having a first non-orthogonal surface relative to a first axis of said first core;

a second optical fiber having a second core terminating at a second terminal end;

aligning means for aligning said first terminal end in optically coupled relation to said second terminal end while permitting rotation of said first fiber about said first axis;

said first and second optical fibers are maintained in spaced opposing relation with a spacing between said cores being substantially fixed; and said first surface is a portion of a spherical surface.

18. An attenuator for a fiber optic transmission system, said attenuator comprising:

a first optical fiber having a first core terminating at a first terminal end with said first terminal end having a first non-orthogonal surface relative to a first axis of said first core;

a second optical fiber having a second core terminating at a second terminal end, said second fiber having a second non-orthogonal surface relative to a second axis of said second core;

aligning means for aligning said first terminal end in optically coupled relation to said second terminal end while permitting rotation of said first fiber about said first axis;

said first and second optical fibers are maintained in spaced opposing relation with a spacing between said cores being substantially fixed; and said second surface is a portion of a sphere.

* * * * *